United States Patent

Bonga

[11] 3,939,322
[45] Feb. 17, 1976

[54] ELECTRODE TOOL HOLDER ASSEMBLY FOR ELECTRICAL MACHINING APPARATUS

[75] Inventor: Benno Ibo Bonga, Onex, Geneva, Switzerland

[73] Assignee: Ateliers des Charmilles, S.A., Geneva, Switzerland

[22] Filed: June 10, 1974

[21] Appl. No.: 477,806

[30] Foreign Application Priority Data
June 15, 1973 Switzerland.................. 8680/73

[52] U.S. Cl......... 219/69 R; 204/297 R; 219/69 E; 279/89
[51] Int. Cl.²...................... B23P 1/08; B23Q 1/08
[58] Field of Search........ 219/69 R, 69 E, 138, 142, 219/143, 144; 279/89, 102, 103; 269/47; 204/297 R, 286, 224 M

[56] References Cited
UNITED STATES PATENTS

| | | | |
|---|---|---|---|
| 1,766,136 | 6/1930 | Markstrum | 279/89 |
| 2,634,985 | 4/1953 | Groen | 279/103 |
| 2,922,022 | 1/1960 | Mironoff | 219/69 E |
| 3,594,537 | 7/1971 | Morgenegg | 219/69 E |
| 3,741,573 | 6/1973 | Treer | 219/69 E |
| 3,759,536 | 9/1973 | Boonzini | 279/89 |
| 3,762,264 | 10/1973 | Scott | 279/89 X |

*Primary Examiner*—Bruce A. Reynolds
*Attorney, Agent, or Firm*—Hauke, Patalidis & Dumont

[57] ABSTRACT

A tool holder assembly, particularly for holding an electrode tool on the end of the quill or ram of an electro-erosion machining apparatus, comprising a tapered bore disposed at the end of the quill or ram and a taper-shank electrode tool fitting the tapered bore, combined with manually releasable spring biased means for exerting on the electrode tool taper-shank a force urging it into engagement with the tapered bore, and with manually operable means for exerting on the electrode tool taper-shank a force in an opposite direction for disconnecting the taper-shank from the tapered bore. Angular positioning abutment means are also provided for angularly locating the electrode tool in the holder assembly.

6 Claims, 4 Drawing Figures

ELECTRODE TOOL HOLDER ASSEMBLY FOR ELECTRICAL MACHINING APPARATUS

BACKGROUND OF THE INVENTION

The present invention provides a manually operable quick connect and disconnect tool holder assembly permitting to mount a tool in a tool supporting element of a machine, with high positional precision with respect to the centering of the tool as well as with respect to its angular orientation. More particularly, the present invention has particular applications for mounting an electrode tool on the end of the servo controlled linearly movable quill or ram of an electro-erosion machining apparatus, such as, for example, an electrical discharge machining apparatus.

Many devices have been designed for holding an electrode tool on the end of the quill or ram of an EDM machine, such as, for example, the electromagnetic electrode holder disclosed in U.S. Pat. No. 2,978,616 but few, if any, of such devices are capable of combining accurate centering of the electrode tool with precise angular positioning of the tool in a quick connect and disconnect device permitting to rapidly interchange tools when so required. It is known to mount a tool by way of a tapered bore adapted to accept the taper-shank of the tool, such holder providing a highly accurate centering of the tool. However, such holder devices are generally not provided with means permitting to effectuate precise angular positioning of the tool.

The tool holder assembly of the invention permits to effectuate a rapid coupling and uncoupling of an electrode tool with the movable element, quill or ram, of an EDM machine. In addition, the mating elements may be easily cleaned, with the result that repetitive and precise centering of the electrode tool is assured. Furthermore, the elements forming the tool holder assembly of the invention are relatively few and they are easily manufactured, such that a tool holder according to the invention is relatively low in cost.

To insure precision in the manufacture of an electrode tool designed for co-operating with the tool holder assembly of the invention, it is advantageous to mount the tool holder blank on a conventional machine tool by means of the tool holder assembly of the invention during machining of the electrode tool. If, for example, the electrode tool is made on a shaper to a particular shape requiring locating relative to predetermined angular positions, a high precision of the centering and angular positioning of the electrode tool blank is required during machining, and holding the electrode tool blank on the conventional machine tool during machining by means of the holder assembly of the invention presents the advantage of holding the electrode tool during its machining in the same position and with the same precision as will subsequently be the case when the electrode tool is mounted on the ram of an EDM machine.

SUMMARY OF THE INVENTION

The principal object and advantage of the present invention is to provide an electrode tool holder assembly for mounting an electrode tool on the end of an EDM machine ram, by utilizing a female conical element providing a high precision of centering of the male taper-shank of the electrode tool, and further providing a predetermined angular positioning of the electrode tool relative to the holder. The holder assembly of the invention further provides a quick connect and disconnect means, between an electrode tool and the ram of an EDM machine, by having clamping means holding the electrode tool securely and rigidly in position by simple manipulation of an element of the tool holder assembly, the same element permitting to effectuate the removal of the electrode tool from the tool holder, all this being accomplished without the use of auxiliary tools.

The many objects and advantages of the present invention will become apparent to those skilled in the art when the following description of some of the best modes contemplated for practicing the invention is read in conjunction with the accompanying drawing wherein like reference numerals refer to like and equivalent elements and in which:

DETAILED DESCRIPTION OF THE PREFERRED EMBODIMENTS

Figure 1:
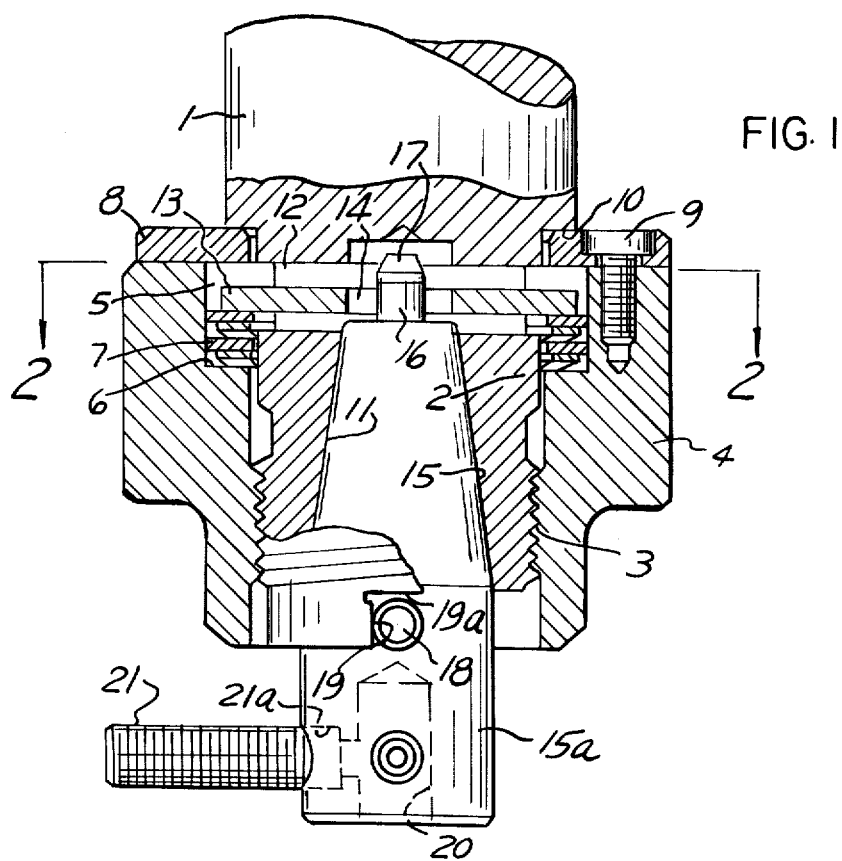
FIG. 1 is a view, partly in elevation and partly in section, of a structural example of an electrode tool holder assembly according to the present invention.
Figure 2:
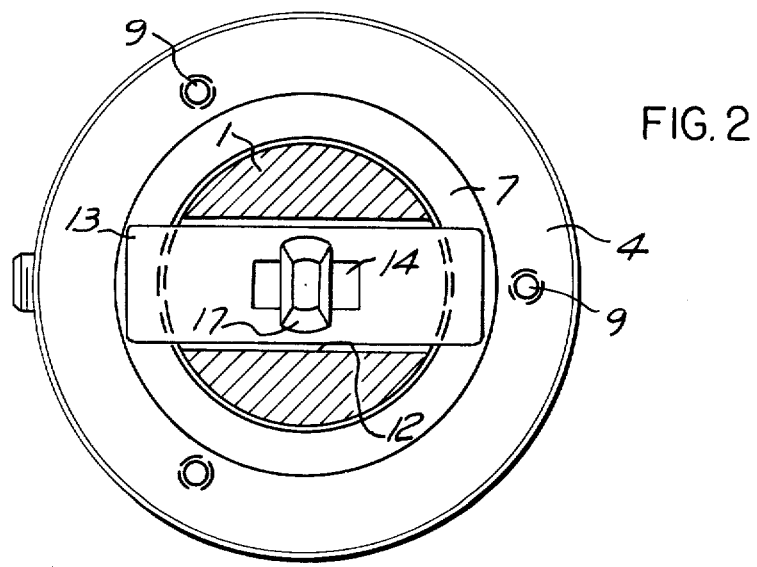
FIG. 2 is a transverse section along line 2—2 of FIG. 1.

Referring now to FIGS. 1 and 2, a cylindrical member 1, the lower end of which is illustrated, represents the electrode tool supporting quill or ram, whose linear displacements are controlled by means of a servo mechanism, not shown, of an apparatus such as, for example, an apparatus for machining a workpiece by electrical erosion. The cylindrical member 1 is provided with an end portion 2 of reduced diameter having an outer thread 3 engageable with the corresponding inner thread of a sleeve 4.

The sleeve 4 has an internal portion 5 of enlarged diameter defining an annular step surface 6. A plurality of resilient washers such as, for example, Belleville washers or the like, are disposed in the enlarged diameter portion 5, with the last of the resilient washers 7 engaging the annular step surface 6. A ring 8 is mounted on the upper end face of the sleeve 4 by means such as screws 9. The ring 8 has for function to limit the amount of longitudinal travel of the sleeve 4, while being manually threaded upon the threaded end 2 of the cylindrical member 1, by engagement with an annular abutment 10 formed on the cylindrical member 1 between its nominal diameter portion and its reduced diameter end portion 2.

The end portion 2 of the cylindrical member 1 is provided with a conical or tapered bore 11 having its larger diameter portion towards the lower end face of the cylindrical member 1. The cylindrical member 1 is further provided with a transverse slot 12 in which is disposed a flat rectangular peg 13 the ends of which engage the uppermost one of the resilient washers 7 such that the washers are normally held in compression. The peg 13 has a rectangular aperture 14 disposed at its center.

The tapered bore 11 on the end portion 2 of the cylindrical member 1 accepts in engagement therewith the taper-shank portion 15 of a mandrel 15a. The end of the taper-shank portion 15 of the mandrel 15a is provided with an integral projecting prong 16 having an enlarged end 17 of a width slightly less than the width of the rectangular aperture 14 in the peg 13 and of a length greater than such width.

The mandrel 15a is provided proximate its lower end with a laterally projecting pin 18 adapted to engage an abutment 19 formed at the edge of the end portion 2 of the cylindrical member 1 as a result of having removed a section thereof, as shown at 19a. Engagement of the pin 18 laterally with the abutment 19 causes the mandrel 15a to be angularly oriented with precision relative to the cylindrical member 1. The mandrel 15a is provided with means for mounting on the end thereof an electrode tool, not shown, such means consisting of, for example, a longitudinal bore 20 accepting the shank of the electrode tool which is held in position by means of a set screw 21 projecting through a radially disposed threaded bore 21a.

In order to affix the electrode to the end of the quill or ram of an EDM apparatus, the machine operator inserts the taper-shank 15 of the electrode supporting mandrel 15a into the tapered bore 11 on the end of the ram cylindrical member 1, and orients angularly the mandrel 15a about its longitudinal axis to a position permitting the enlarged end 17 of the prong 16 to pass through the rectangular aperture 14 in the peg 13. The operator then rotates the mandrel 15a to bring the pin 18 in engagement with the abutment 19. In the angular position of the mandrel providing engagement of the pin 18 with the abutment 19, the enlarged portion 17 on the end of the prong 16 has been rotated about a quarter of a turn relative to the rectangular aperture 14, such that the mandrel 15a is axially locked relative to the peg 13.

Finally, the sleeve 4 is manually rotated in the appropriate direction advancing the ring 8 towards the annular step 10 until the upper face of the ring 8 engages the surface of the annular step. This in turn causes the resilient washers 7 to expand, thus displacing the peg 13 upwardly, as seen in the drawing, which in turn exerts on the mandrel 15a an axial force upwardly directed tending to wedge the taper-shank portion 15 of the mandrel in the tapered bore 11.

When it is desired to remove the mandrel 15a, for example if it is desired to change electrodes, the sleeve 4 is turned in an opposite direction until the lower face of the ring 8 engages the upper surface of the ends of the peg 13. Further rotation of the sleeve 4 causes an axial force to be applied, through the peg 13, on the end of the taper-shank portion 15 of the mandrel 15a, thus extracting the mandrel taper-shank portion 15 from the tapered bore 11. Such an arrangement presents many advantages in structures wherein the angle of taper of the taper-shank portion 15 of the mandrel and the corresponding taper angle of the tapered bore 11 have a value small enough to cause a wedging of the taper-shank portion in the tapered bore. It will be appreciated however that the taper angle may be arbitrarily chosen so as to be, for example, larger than shown in the drawing such that the taper-shank portion 15 of the mandrel may be disconnected from the tapered bore recess 11 without the necessity of exerting on the taper-shank portion a force directed downwardly.

As a result of the only force axially directed for pulling the taper-shank portion 15 of the mandrel 15a towards the bottom of the tapered bore 11 being provided by the resilient washers 7, the force may be limited to a very precise value as small as desirable to prevent elastic or permanent deformation of the end portion 2 of the cylindrical member 1. Furthermore, as such a force remains substantially constant, a well defined position of the mandrel 15a relative to the cylindrical member 1 is repeatedly achieved any time a new electrode is mounted on the end of the cylindrical member 1.

Figure 3:
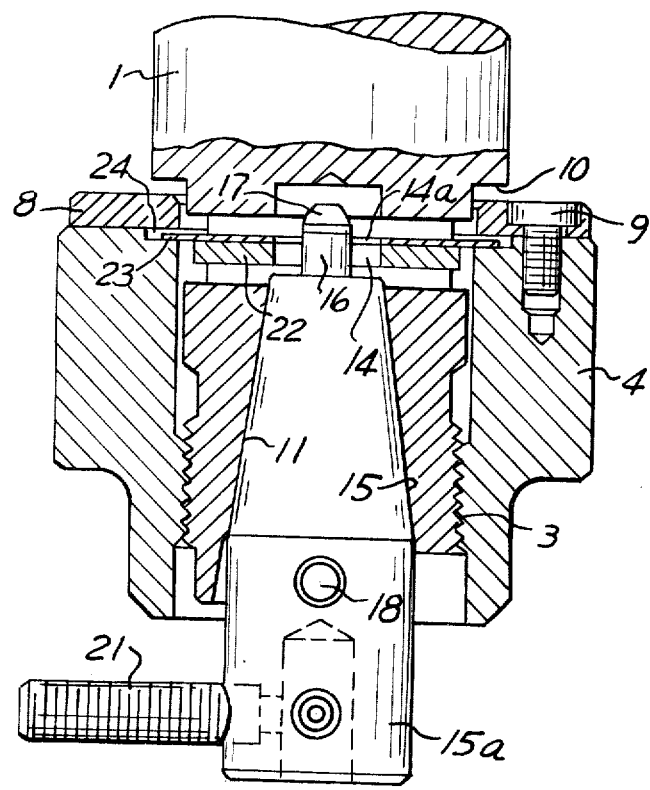
FIG. 3 is a view similar to FIG. 1, but showing a modification of the structure thereof.

FIG. 3 represents a modification of the structure illustrated at FIG. 1 which closely resembles that of FIG. 1, and in which the same elements are identified by the same reference numerals. The only difference between the structure of FIG. 1 and that of FIG. 3 consists in replacing the transverse peg 13 and the resilient washers 7 by a relatively rigid shorter bar or peg 22 and a thin flexible blade 23, for example made of spring steel. The bar or peg 22 and the flexible blade 23 are each provided at their center with a rectangular aperture 14, 14a, respectively, and they are fastened together, for example by means of rivets, not shown, disposed proximate the rectangular apertures 14 and 14a. The ends of the flat spring blade 23 extend in an annular recess, defining an annular shoulder 24, formed in the upper end face of the sleeve 4 between such end face and the lower face of the ring 8. Thereby, in the course of tightening the sleeve 4 the force pulling the taper-shank portion 15 of the mandrel 15a towards the bottom of the tapered bore 11 is applied by the flat spring blade 23 tending to recover its straight shape from its previously bowed shape, which limits this force to a substantially constant predetermined value.

When the sleeve 4 is rotated in an opposite direction, the axially directed force urging the taper-shank portion 15 of the mandrel 15a to disengage from the tapered bore 11 is directly transmitted from the ring 8 to the bar or peg 22 through the intermediary of the ends of the flat spring blade 23. In this manner, the amount of flexion of the bar or peg 22 is limited to a very small value such that the force used for extracting the taper-shank portion 15 from the tapered bore 11 may be as large as necessary, and in all cases larger than the force exerted in the course of pulling the taper-shank portion 15 into the tapered bore 11. Any problem resulting from a possible wedging of the taper-shank portion 15 in the tapered bore 11 is thus avoided.

Figure 4:
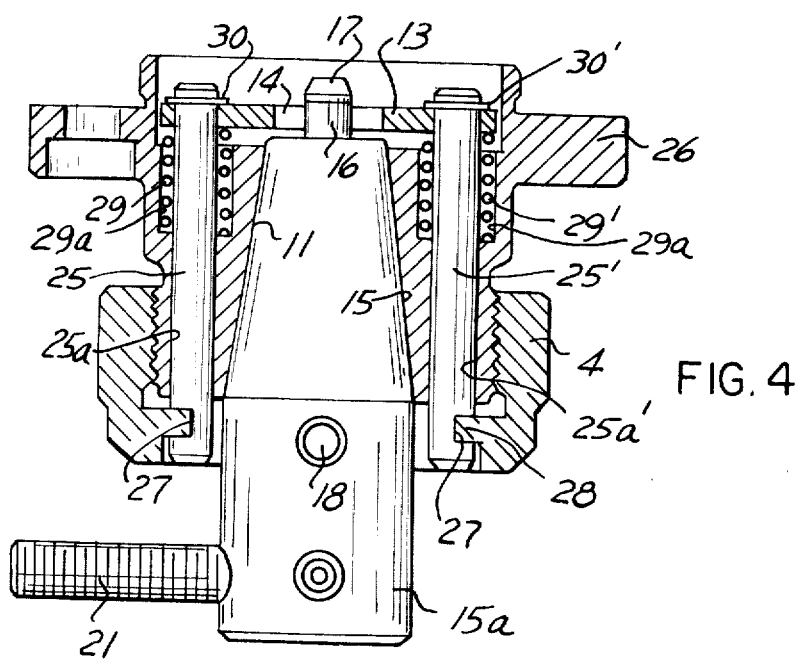
FIG. 4 is a view similar to FIG. 1, but showing a further modification thereof.

The embodiment illustrated at FIG. 4 comprises the same taper-shank portion 15 for a mandrel 15a provided, as precedently described with respect to the embodiments of FIGS. 1 and 3, with a projecting prong 16 having an enlarged end portion 17 normally engaged in the rectangular aperture 14 of a transverse peg 13. The peg 13 is provided proximate each of its ends with a circular aperture in which is slidably disposed a rod 25, 25' respectively, in turn slidably disposed in a bore 25a, 25'a respectively, longitudinally formed in the end portion 26 of the servo controlled movable quill or ram of the EDM apparatus. Each rod, 25 or 25', has a lateral cut-out portion as shown at 27 in which is engaged an inwardly projecting annular ridge 28 dependent from the inner surface of the sleeve 4. The coaxial longitudinal force exerted on the mandrel 15a urging the taper-shank portion 15 of the mandrel towards the bottom of the tapered bore 11 is provided solely by two coil springs 29 and 29' disposed respectively around the rods 25 and 25', each in an appropriate cylindrical recess 29a disposed in the end portion 26 of the ram, the springs 29 and 29' being normally compressed so as to exert an upwardly directed force upon the peg 13. The force tending to extract the taper-shank portion 15 of the mandrel 15a from the tapered bore 11 is transmitted from the sleeve 4 through the rods 25 and 25' to the peg 13 by means of snap rings 30 and 30' disposed in appropriate grooves formed on the periphery of the ends of the rods 25 and 25' projecting above the upper surface of the peg 13.

Many variations of structures according to the present invention will be readily apparent to those skilled in the art. For example, the force holding the taper-shank portion of the mandrel in the tapered bore may be obtained by means other than the spring means disclosed. For instance, hydraulic, pneumatic or electromagnetic means may be used. However, the force exerted for extracting the taper-shank portion from its tapered bore should preferably be such as to be normally greater than the force used for holding the taper-shank portion in position in the tapered bore, even though an angle of taper preventing wedging of the mating parts may have been chosen, because it may be necessary in certain ocasions to overcome a force of attraction between the mating parts caused by a suction effect or due to dirt particles entrapped between the surfaces in engagement.

Although the present invention has been described and illustrated as an electrode tool holder assembly for an EDM machine, it will be appreciated that the same principles and structures may be used for an electrode holder assembly for ECM (electrochemical machining) apparatus and for tool holders for certain conventional machine tools.

Having thus described the invention by way of examples of structure relative thereto, what is claimed as novel is as follows:

1. An electrode tool holder assembly for removably mounting an electrode tool on the ram of an electro-erosion machine, said holder assembly comprising an electrode supporting mandrel having a taper-shank portion, a tapered bore disposed in the end of said ram and adapted for coaxial engagement with said mandrel taper-shank portion, a projecting integral prong at the end of said mandrel taper-shank portion, a longitudinally displaceable sleeve disposed about the end of said ram, a peg element disposed transversely relative to the longitudinal axis of said mandrel taper-shank portion and displaceable along said londitudinal axis, means on said peg element for locking engagement with said projecting prong by rotation of said mandrel taper-shank portion relative to said peg element, biasing means for normally urging said peg element in a direction pulling said mandrel taper-shank portion in engagement with said tapered bore, abutment means on said sleeve engageable with said peg element for displacing said peg element and said mandrel taper-shank portion in a direction separating said mandrel taper-shank portion from said tapered bore when said sleeve is displaced in a predetermined direction relative to said ram, and means for angularly locating said mandrel taper-shank portion relative to said tapered bore about said longitudinal axis.

2. The holder assembly of claim 1 wherein said sleeve is threadably engaged with the periphery of said ram for longitudinal displacement relative thereto by rotation of said sleeve.

3. The holder assembly of claim 1 wherein said locking means on said peg member consists of a substantially rectangular aperture and said projecting integral prong at the end of said mandrel taper-shank portion has a substantially rectangular enlarged portion for engagement into said rectangular aperture for locking of said mandrel taper-shank portion to said peg member by rotation of said taper-shank portion about its axis relative to said member.

4. The holder assembly of claim 1 wherein said biasing means comprises a stepped annular surface in said sleeve and a plurality of superimposed resilient washers disposed between said peg element and said annular surface.

5. The holder assembly of claim 1 wherein said biasing means comprises a flat spring blade disposed transversely relative to the longitudinal axis of said mandrel taper-shank portion, the ends of said spring blade being engaged into an enlarged diameter portion of said sleeve and said spring blade being disposed adjacent to said peg element located between said blade and the end of said mandrel taper-shank portion engaged in said tapered bore, said abutment means being engageable with said ends of said spring blade for displacing said peg element such as to loosen said mandrel taper-shank portion from said tapered bore.

6. The holder assembly of claim 1 wherein said biasing means comprises said peg element provided at each end thereof with a bore in which is engaged a rod disposed parallel to said longitudinal axis, said rods being slidable in the end of said ram and having an end attached to said sleeve so as to follow the longitudinal displacement of said sleeve, each rod having an abutment cooperating with said peg element for urging said peg element against the end of said taper-shank portion such as to convey to said mandrel taper-shank portion a force tending to loosen said taper-shank portion from said tapered bore, and coil spring means applied to said peg element for urging said peg element in a direction tending to hold said mandrel taper-shank portion in said tapered bore.

\* \* \* \* \*